UNITED STATES PATENT OFFICE 2,367,903

SPRAY METHOD OF MAKING MIRRORS

Charles Trevail and Kurt P. Gladney, London, Ontario, Canada, assignors to Hobbs Glass Limited, London, Ontario, Canada, a corporation of the Dominion of Canada No Drawing. Application February 25, 1944, Serial No. 523,918. In Canada September 3, 1943

5 Claims. (Cl. 117—35)

This invention relates to the production of mirrors and more particularly to an improved spray method of applying a film or layer of silver to provide a reflecting or decorative medium on glass or other surfaces.

In United States Patent 2,214,476, issued September 10, 1940, there is disclosed a spray method of making mirrors wherein certain hydrazine compounds are employed as the reducing agent for the silvering solution. By means of an air jet the separately formed silvering and reducing solutions are intimately mixed and directed against the surface to be coated, the reaction between the solutions producing metallic silver to be deposited on the surface to be coated. The particular silvering solution there disclosed consists of 1 ounce of silver nitrate dissolved in 100 ounces of distilled water to which 1.75 ounces of ammonium hydroxide is added, and the reducing solution 2 ounces of hydrazine sulphate, nitrate or hydrate dissolved in 100 ounces of water.

The object of the present invention is to provide an improvement in that method. More particularly the object is to provide for great economy of materials by insuring maximum utilization of the silvering and reducing solutions in the prompt formation of a film of silver which well adheres to the glass, which is practically free from "so-called" pin holes, which has improved hardness and resistance to scratching and other deteriorating influences.

Other objects and advantages of the method of the invention will appear from the following description.

It will be understood that in carrying out the now well known spray method, the surface to be coated is placed in an inclined position and the spray of the mixed solutions is caused to impinge on the inclined surface. The reducing agent liberates metallic silver, but with the particular solutions heretofore disclosed and used an excessive amount of the silver fails to adhere or only loosely adheres to the surface. Much of it is thus carried away with the spray and not utilized in forming the film. Moreover loosely adhering deposit tends to prevent the formation of a desirable coating. There is a substantial wastage of the silvering and reducing solutions and accordingly the effective coating coverage provided by a unit of the solution is economically small.

It has now been found that these objections to the known method are eliminated or substantially removed by using definite and substantially higher proportions of the reagents in the silvering solution and lower proportions of hydrazine in the reducing solution, and preferably by adding a new reagent to the reducing solution. The new reagent employed is the sulphate of magnesium, sodium, potassium or ammonia. It is added to the reducing solution which contains hydrazine sulphate in distilled water.

The preferred solutions are as follows:

The silvering solution is formed by dissolving 4 ounces of silver nitrate with 8 to 12 ounces of aqueous ammonia in 160 ounces of distilled water. It therefore contains 2.5 parts by weight of silver nitrate and 1.6 to 2.5 parts by weight of ammonia per 100 parts of distilled water. The silver nitrate content may be varied, but should not exceed 3 parts nor be less than 1.8 parts per 100 parts of distilled water.

The reducing solution is formed by dissolving 2 ounces of hydrazine sulphate and 0.5 ounce of crystalline magnesium sulphate in 160 ounces of distilled water. It contains 1.25 parts by weight of the hydrazine reducing agent and 0.31 of crystalline magnesium sulphate per 100 parts of distilled water. It should not contain more than 1.25 parts nor less than 0.6 part of hydrazine sulphate in 100 parts of distilled water. The proportion of the auxiliary sulphate reagent may be within somewhat wider limits. As illustrative of other proportions of addition agent, it is stated that up to 1.25 parts of magnesium sulphate, 0.25 to 0.9 part of potassium sulphate, 0.2 to 0.75 part of sodium sulphate and 0.125 to 0.7 part of ammonium sulphate per 100 parts of water have given good results.

Use of solution of the substantially increased concentration increases the mirror production per hour of spray operation from 400 square feet to substantially 1040 square feet. It more than doubles the area of mirror surface produced per pound of silver nitrate and effects a similar economy in the use of the hydrazine reducing agent. At the same time the quality of the reflecting silver film coating is improved in its adherence, continuity, hardness and freedom from cloudiness which so frequently occurs in mirrors.

In the spray method in which the solution is in contact with the sprayed surface but a short time, it has become apparent, through long investigation, that the reducing reaction within the sprayed solution must be closely regulated, if a good reflecting surface is to be produced. Applicants have found that efficient control is provided by the above critical proportions in the solutions and particularly by the inclusion of the sulphate addition agent which appears to influence through ionization the action of the hydrazine reducing agent. The higher proportions of the sulphate addition agent are used with minimum periods of contact between the spray and the surface to be coated. The latter varies with the position of the glass surface being sprayed. The reaction between the solution is so sensitive that this factor must be considered.

While the illustrative examples specify hydrazine sulphate, which is preferred, the hydrazine nitrate or hydrate may be used.

We claim:

1. A method of coating a surface with a reflecting film of silver which comprises projecting on to the surface in the form of a unitary spray separately formed silvering and reducing solutions, the silvering solution containing silver in the form of a nitrate and the reducing solution containing hydrazine sulphate and one of a group consisting of magnesium sulphate, sodium sulphate, potassium sulphate and ammonium sulphate.

2. A method of coating a surface with a reflecting film of silver which comprises projecting on to the surface in the form of a unitary spray separately formed aqueous silver nitrate solution and an aqueous reducing solution containing one of a group consisting of hydrazine sulphate, hydrazine nitrate and hydrazine hydrate and as an addition agent one of a group consisting of magnesium sulphate, sodium sulphate, potassium sulphate and ammonium sulphate the addition being within the proportions of 0.2 to 1.25 parts per 100 parts of water.

3. A method of coating a surface with a reflecting film of silver which comprises spraying the surface with a dispersed mixture of separately formed aqueous silvering and reducing solutions, the dispersed mixture containing hydrazine sulphate and 0.31 to 1.25 parts of magnesium sulphate per 100 parts of water.

4. A method of coating a surface with a reflecting film of silver which comprises spraying the surface with a dispersed mixture of separately formed silvering and reducing solutions, the silvering solution containing substantially 4 ounces of silver nitrate and 8 to 12 ounces of aqueous ammonia in 160 ounces of distilled water, and the reducing agent containing substantially 2 ounces of hydrazine sulphate and 0.5 ounce of magnesium sulphate per 160 ounces of distilled water.

5. A method of forming a film of metallic silver upon a glass or like surface which comprises projecting against the surface a spray in which are intimately dispersed separately formed aqueous solutions adapted to react with each other to liberate metallic silver, said solutions containing silver nitrate, ammonium hydroxide, hydrazine sulphate and substantially 0.31 part of magnesium sulphate per 100 parts of water.

CHARLES TREVAIL.
KURT P. GLADNEY.